United States Patent
Tennebroek et al.

(10) Patent No.: US 9,416,295 B2
(45) Date of Patent: *Aug. 16, 2016

(54) AQUEOUS AUTOXIDISABLE COATING COMPOSITION

(71) Applicant: DSM IP ASSETS B.V., Heerlen (NL)

(72) Inventors: Ronald Tennebroek, Waalwijk (NL); Gerardus Cornelis Overbeek, Waalwijk (NL); Franciscus Adrianus Cornelis Bergman, Zwolle (NL); Mourad Aabich, Waalwijk (NL); Richard George Coogan, Wilmington, MA (US); Roel Johannes Marinus Swaans, Waalwijk (NL)

(73) Assignee: DSM IP ASSETS B.V., Heerlen (NL)

( * ) Notice: Subject to any disclaimer, the term of this patent is extended or adjusted under 35 U.S.C. 154(b) by 70 days.

This patent is subject to a terminal disclaimer.

(21) Appl. No.: 13/936,025

(22) Filed: Jul. 5, 2013

(65) Prior Publication Data

US 2013/0296486 A1 Nov. 7, 2013

Related U.S. Application Data

(63) Continuation of application No. 12/918,932, filed as application No. PCT/EP2009/053822 on Mar. 31, 2009, now abandoned.

(30) Foreign Application Priority Data

Mar. 31, 2008 (EP) ..................................... 08006273

(51) Int. Cl.
| | | |
|---|---|---|
| C08L 77/12 | (2006.01) |
| C09D 133/14 | (2006.01) |
| C08G 18/28 | (2006.01) |
| C08G 18/42 | (2006.01) |
| C08G 18/60 | (2006.01) |
| C08G 18/75 | (2006.01) |
| C09D 167/08 | (2006.01) |
| C09D 175/04 | (2006.01) |
| C09D 177/12 | (2006.01) |

(52) U.S. Cl.
CPC ............ *C09D 133/14* (2013.01); *C08G 18/283* (2013.01); *C08G 18/423* (2013.01); *C08G 18/4211* (2013.01); *C08G 18/4233* (2013.01); *C08G 18/606* (2013.01); *C08G 18/755* (2013.01); *C09D 167/08* (2013.01); *C09D 175/04* (2013.01); *C09D 177/12* (2013.01); *Y10T 428/31511* (2015.04)

(58) Field of Classification Search
CPC .. C09D 167/08; C09D 175/06; C09D 177/12; C08G 18/4233
See application file for complete search history.

(56) References Cited

U.S. PATENT DOCUMENTS

| | | |
|---|---|---|
| 5,004,779 A | 4/1991 | Blum et al. |
| 6,277,953 B1 | 8/2001 | Nothnagel et al. |
| 6,627,700 B1 | 9/2003 | Kadambande et al. |
| 2003/0191231 A1 | 10/2003 | Martin et al. |
| 2004/0039089 A1 | 2/2004 | Buckmann |
| 2011/0064933 A1 | 3/2011 | Bergman et al. |

FOREIGN PATENT DOCUMENTS

| | | |
|---|---|---|
| WO | 02/10297 | 2/2002 |
| WO | 02/33012 | 4/2002 |

OTHER PUBLICATIONS

International Search Report for PCT/EP2009/053822, mailed Jul. 9, 2009.

*Primary Examiner* — Wenwen Cai
(74) *Attorney, Agent, or Firm* — Nixon & Vanderhye P.C.

(57) ABSTRACT

An aqueous coating composition comprising an autoxidizable polyester resin having ≥30 wt % of fatty acid residues; a Tg in the range of from −60° C. to +35° C.; an acid value greater than 15 mg KOH/g and less than 75 mg KOH/g; a Mw in the range of from 2,500 to 100,000 g/mol; the composition having a co-solvent content less that 15 wt % by weight of total composition; a solids content >30 wt %; and when in the form of a film, the composition has a telegraphing value of less than 20 gloss units.

15 Claims, No Drawings

AQUEOUS AUTOXIDISABLE COATING COMPOSITION

This application is a continuation of commonly owned copending U.S. application Ser. No. 12/918,932, filed Dec. 29, 2010 (now abandoned), which is the national phase application of International Application PCT/EP2009/053822, filed Mar. 31, 2009, which designated the US and claims benefit of EP Patent Application No. 08006273.0, filed Mar. 31, 2008, the entire contents of each of which are hereby incorporated by reference.

The present invention relates to certain coating compositions that comprise an autoxidisable component and processes for making such compositions. Coatings of the invention show reduced telegraphing of surface irregularities after the composition has been applied to a surface.

There is a general need when applying a decorative or protective coating to a substrate to obtain a smooth surface without visible irregularities. The degree to which an underlying surface can be visually ascertained through a coating is often described as telegraphing. It has been found that irregularities on substrates (such as wood), which contribute to the roughness, are often telegraphed through conventional aqueous coatings.

Thicker coating materials are often used to reduce telegraphing because they are sufficiently able to level out any unevenness in the surface. Thus the underlying surface roughness of the substrate shows through to a reduced extent into the final coating which appears visually smooth. However, thicker coatings are disadvantageous because they may need to be applied in several layers, increasing the cost. Also slower through-drying, wrinkling and sagging can occur when using thicker layers.

Organic solvents have been used to improve telegraphing. However with a continuing concern about the use of organic solvents there has been a long felt need for an aqueous coating composition with comparable properties to those achievable using compositions based on organic solvents.

A coating should also dry sufficiently quickly to avoid the adherence of dust and ensure that the coating quickly becomes water resistant (e.g. in case of outdoor applications) and/or tack-free.

Aqueous compositions such as water dilutable traditional autoxidisable polyesters (also known as water dilutable alkyds or alkyd emulsions) have also been used to address the issue of telegraphing. However these systems have many well known problems.

Water dilutable autoxidisable alkyds may suffer from backbone hydrolysis. This may lead to changes in the performance over time which is undesirable. Traditional alkyd emulsions are discussed in "Water borne and solvent based alkyds and their end user applications" by N. Tuck, volume VI, Wiley/Sita Series In Surface Coatings technology; (ISBN 471985910) published in 2000.

Another common problem of traditional alkyd emulsions is their tendency to produce cissing (also known as crawling) when applied as an over-coat. Cissing is when a coating refuses to form a continuous film, recedes from the surface, collects in beads and leaves the surface partially exposed thus reducing the appearance of the painted object.

Yet another disadvantage of traditional alkyd systems, especially those containing a relatively high percentage of unsaturated fatty acid residues, is their pronounced tendency to yellow (in light or dark) over time.

Current coatings lack some or all of the above mentioned performance characteristics, so coatings which exhibit reduced telegraphing with a combination of low yellowing over time and/or reduced cissing are desired.

It is also generally known that polyester based alkyds typically have a broad molecular weight distribution and thus comprise a significant amount of material having a low molecular weight, which dries more slowly and therefore means the coating remains tacky for a longer period (i.e. has long tack free times). The presence of material of lower molecular weight cannot be avoided for many reasons. For example both glycerol (with three fatty acids—triglycerides) and pentaerythritol (with four fatty acids) are common raw materials used to prepare polyester based alkyds. To address the issues raised by the presence of the low molecular weight fraction, polyester based alkyds may be prepared in a highly branched form to obtain a high molecular weight fraction that dries more quickly. However the resultant branched polyester based alkyds have a significantly increased viscosity and reduced flow (compared to the less branched equivalent) and thus must be diluted with more organic solvent before they can be used. This is undesirable as for example it increases the amount of volatile organic compounds (VOCs) and adversely effects the flow of the composition.

Prior aqueous coatings have not been widely accepted in many markets as alternatives to solvent based coatings. For example solvent based alkyds are still preferred in the decorative market, where very low telegraphing is required as these coatings are often applied by brush. It is also desired that aqueous compositions are not milky or opaque but clear or transparent.

U.S. Pat. No. 5,096,959 discloses water based alkyd resins that are modified to provide increased hydrolytic stability by reacting them with a polybasic acid composition containing one or more cycloaliphatic polybasic acids.

GB 1,048,893 describes fatty acid functional water soluble resins, that are derived from phthalic acid or phthalic anhydride and dihydroxy acids. The alkyds are either heat curable with melamines or air drying.

U.S. Pat. No. 4,145,319 describes water soluble alkyds that are making use of trimellitic anhydride to obtain water solubility.

However, the carboxylic acid groups derived from trimellitic anhydride are not stable against hydrolysis, which is a disadvantage in decorative paints.

WO 2007/147559 describes air drying fatty acid functional hyperbranched resins. The resins are water soluble, due to a relatively high OH content and a low fatty acid level. This is less desirable due to the effect it has on water resistance and rate of cure and therefore on final properties.

U.S. Pat. No. 4,220,568 describes waterborne alkyds based on trimellitic anhydride.

U.S. Pat. No. 5,552,475 describes saponification resistant alkyds with low levels of fatty acid.

U.S. Pat. No. 6,277,953 describes a process for forming a stable aqueous dispersion of a polyester polymer or an alkyd polymer which is substantially free of an emulsifier.

WO 2002/10297 describes stable aqueous alkyd polymer dispersions and blends thereof with latexes.

U.S. Pat. No. 6,627,700 describes an aqueous dispersion of an acrylate-modified alkyd resin via graft copolymerisation.

Thus with the continuing concern about the use of organic solvent based coatings there has been a long felt need for an aqueous coating composition with comparable properties to those achievable using organic solvent based compositions.

In a more preferred object of the invention the method can be used with a wide variety of coating compositions.

We have now found ways to overcome the above mentioned disadvantages, especially when combinations of more then one of the problems need to be overcome in one coating system.

It is an object of the invention to solve some or all of the problems identified herein. A preferred object of the invention provides a method of improving the appearance of coated substrates, when the substrates contain visual irregularities.

A coating should also dry sufficiently quickly to avoid the adherence of dust and to ensure that the coating quickly becomes water resistant (in case of outdoor applications) and quickly becomes tack-free.

In a more preferred object of the invention the method can be used with a wide variety of coating compositions.

Therefore according to the present invention there is provided an aqueous coating composition comprising an autoxidisable polyester resin, said autoxidisable polyester resin having:
i) >30 wt % of fatty acid residues;
ii) a Tg in the range of from −60° C. to +35° C.;
iii) an acid value greater than 15 mg KOH/g and less than 75 mg KOH/g; and
iv) a Mw in the range of from 2,500 to 100,000 g/mol;
said composition having:
a) a co-solvent content 15 wt % by weight of total composition;
b) a solids content >30 wt %; and
said composition when in the form of the film having a telegraphing value of less than 20 gloss units;
where the telegraphing value is the difference between an initial smooth gloss value minus an initial rough gloss value of the film, where
the initial smooth gloss value is the gloss when the film is cast on smooth PVC ($R_z$=1 μm [±0.25 μm]);
the initial rough gloss value is the gloss when the film is cast on rough PVC ($R_z$=25 μm [±5 μm]); and where
each film has a dry film thickness of 52 μm [±6 μm]; and
each initial gloss value is measured at a 20° angle, one day (24 h) after the film has been cast.

As used herein polyester means any "generic" polyester, optionally containing urethane and/or amide groups. When the polyester resin does not contain urethane and/or amide groups it may also be described as a "pure" polyester. The autoxidisable polyester resin is preferably selected from the group consisting of pure polyester resin, polyesteramide resin, urethanised polyester resin, urethanised polyesteramide resin and mixtures thereof. More preferably the autoxidisable polyester resin is selected from the group consisting of polyesteramide resin, urethanised polyester resin, urethanised polyesteramide resin and mixtures thereof.

As used herein PVC means a polyvinylchloride substrate as described in the test methods herein.

Dry film thickness herein is theoretically calculated from the solid content of the wet layer applied. As used herein, unless the context indicates otherwise, the terms 'standard conditions' denotes a relative humidity of 50%±5%, ambient temperature and an air flow less than or equal to 0.1 m/s; and 'ambient temperature' denotes 23° C.±2° C.

The composition is preferably a non-adhesive composition. As used herein the term 'non-adhesive composition' denotes any composition that does not remain substantially tacky after drying under ambient conditions for a length of time which would be commercially acceptable. Preferred non-adhesive compositions are those which have a tack-free time of less than 16 hours. Tack-free time may conveniently be measured as described herein.

Compositions of the invention dry fast, for example they have short dust- and/or tack-free times. Compositions of the invention have other advantages. They may be prepared with lower viscosities, i.e. less solvent is needed to achieve a certain viscosity suitable for coating applications and in aqueous systems lower viscosity can reduce telegraphing. Alternatively compositions with a similar solvent content to the prior art can be produced with a higher overall molecular weight. Compositions of the invention can also be prepared with a high solids content.

For all upper and lower boundaries of parameters herein, the boundary value is included and all combinations of boundary values may be used to define preferred ranges.

It will be understood that the sum of the amount of all the ingredients that comprise a composition of the invention (or part thereof) when expressed as a percentage of the composition (or the same part thereof) will total 100%.

Preferred compositions of the invention produce coatings that have a telegraphing value (as defined herein) of less than 10 gloss units, more preferably less than 5 gloss units and most preferably less than 2 gloss units.

Preferably the gloss measured at a 20° angle on the film cast on rough PVC should not deteriorate significantly over time. This can be measured as a 'gloss decay' defined as the initial rough gloss value minus a rough gloss value measured at a later specified time. Preferably the gloss decay is measured 4 days, more preferably 7 days and most preferably 14 days after film formation. Preferred values of gloss decay (for example after each of the periods given above) are less than 10 gloss units, more preferably less than 5 gloss units and especially less than 2 gloss units.

Preferably the autoxidisable polyester resin crosslinks at ambient temperature. By crosslinking by autoxidation is meant that crosslinking results from oxidation occurring in the presence of air and usually involves a free radical mechanism and is preferably metal-catalysed resulting in covalent crosslinks. Suitably autoxidation is provided for example by fatty acid residues containing unsaturated bonds and/or by allyl functional residues and/or β-keto ester groups. Preferably autoxidation is provided at least by fatty acid residues containing unsaturated bonds.

As used herein 'fatty acid residue', means fatty acids, simple derivatives thereof (such as esters (e.g. $C_{1-4}$alkyl esters), salts, soaps, oils, fats and/or waxes) and mixtures thereof. Fatty acids may comprise a limited number of other substituents such as hydroxyl groups and may be saturated or mono or poly-unsaturated.

For the purpose of determining the fatty acid residue content of the autoxidisable polyester resin, it is convenient to use the weight of the fatty acid reactant including the ester group formed by the terminal acid group of the fatty acid molecule.

Preferably the concentration of fatty acid residues in the autoxidisable polyester resin is ≥33 wt %, more preferably ≥38 wt % and most preferably ≥43 wt % by weight based on the weight of the resin.

Preferably the concentration of fatty acid residues in the autoxidisable polyester resin is ≤70 wt % and more preferably ≤65 wt % by weight based on the weight of the resin.

Preferably >80 wt % and more preferably 100 wt % of the fatty acid residues in the autoxidisable polyester resin are $C_{10}$ to $C_{30}$, preferably $C_{16}$ to $C_{20}$ fatty acid residues.

For autoxidisable polyester resins used in the invention, unsaturated fatty acids or oils having an iodine number of at least 50, more preferably at least 80 and most preferably at least 100 g $I_2$/100 g fatty acid are preferred. Preferably unsaturated fatty acids or oils having an iodine number of less than 200, more preferably less than 180 and especially less than 150 g $I_2$/100 g fatty acid are preferred. The iodine number may be defined according to DIN 53 241-1 as the quotient of the amount of iodine which is added on to the unsaturated groups (double bonds), with decolourisation, of a sample to be analysed.

Fatty acid residues may be obtained from natural and/or artificial sources. Natural sources include animal sources and/or plant sources. Animal sources may comprise animal fat, butter fat, fish oil, lard, liver fats, sperm whale oil and/or tallow oil and waxes. Examples of waxes are beeswax, candelia and/or montan. Plant sources may comprise waxes and/or oils such as vegetable oils and/or non-vegetable oils. Examples of plant oils are: bitter gourd, borage, calendula, canola, castor, china wood, coconut, conifer seed, corn, cottonseed, dehydrated castor, flaxseed, grape seed, *Jacaranda mimosifolia* seed, linseed, olive, palm, palm kernel, peanut, pomegranate seed, rapeseed, safflower, snake gourd, soya (bean), sunflower, tung, and/or wheat germ. Artificial sources include synthetic waxes (such as micro crystalline and/or paraffin wax), distilling tall oil (a by-product of processing pine wood) and/or synthesis (for example by chemical and/or biochemical methods). Suitable fatty acids also include (Z)-hexadan-9-enoic [palmitoleic] acid ($C_{16}H_{30}O_2$), (Z)-octadecan-9-enoic [oleic] acid ($C_{18}H_{34}O_2$), (9Z,11E,13E)-octadeca-9,11,13-trienoic [α(alpha)-eleostearic also α-oleostearic] acid ($C_{18}H_{30}O_2$) (where α-eleostearic acid comprises >65% of the fatty acids of tung oil), licanic acid, (9Z,12Z)-octadeca-9,12-dienoic [linoleic] acid ($C_{18}H_{32}O_2$), (5Z,8Z,11Z,14Z)-eicosa-5,8,11,14-tetraenoic acid [arachidonic acid] ($C_{20}H_{32}O_2$), 12-hydroxy-(9Z)-octadeca-9-enoic [ricinoleic] acid ($C_{18}H_{34}O_3$), (Z)-docosan-13-enoic [erucic] acid ($C_{22}H_{42}O_2$), (Z)-eicosan-9-enoic [gadoleic] acid ($C_{20}H_{38}O_2$), (7Z,10Z,13Z,16Z,19Z)-docosa-7,10,13,16,19-pentaenoic [clupanodonic] acid and/or combinations thereof.

Fatty acid residues may be obtained and/or obtainable from a plurality of the above sources and/or other sources not listed herein.

In an embodiment of the invention at least 35% by weight, more preferably at least 45% by weight, most preferably at least 55% by weight of the unsaturated fatty acid residues contain at least two unsaturated groups.

However a known problem with many autoxidisable coating compositions is that the resultant coatings have a tendency to yellow, in particular where the autoxidisable groups are derived from polyunsaturated fatty acids may be less acceptable depending on the desired colour of the resultant coating.

To reduce yellowing, the autoxidisable polyester resin preferably comprises unsaturated fatty residues that comprise <10 wt %, more preferably <7 wt %, most preferably <4 wt % and especially <2 wt % of fatty acid containing more than two double bonds. More preferably the autoxidisable polyester resin comprises unsaturated fatty residues that comprise <10 wt %, more preferably <7 wt % of fatty acid residues containing more than three double bonds. Examples of fatty acid residues containing more than two double bonds include linolenic acid, tung oil fatty acid, oleostearic acid, arachidonic acid and clupanodonic acid.

The autoxidisable polyester resin may be obtained from a mixture of conjugated and non-conjugated unsaturated fatty acid residues. Preferably the autoxidisable amide group containing resin is obtained from 20 to 70 wt % of conjugated and 80 to 30 wt % of non-conjugated fatty acid residues. Fatty acid residues having conjugated double bonds are obtained by catalytic isomerisation of natural fatty acids or from dehydrated castor oil. Conjugated oil is preferably obtained by dehydration of castor oil.

If the autoxidisable polyester resin comprises saturated fatty acid residue then it preferably comprises from 0 to 40 wt % of saturated fatty acid residue by weight of total fatty acid residue in the resin, more preferably 0 to 20 wt % and most preferably 2 to 18 wt % as long as an autoxidation of the resin is not impaired. Particularly preferred are autoxidisable polyester resins in which the autoxidisable groups are mainly derived from unsaturated fatty acids.

Examples of saturated fatty acids include but are not limited to butanoic [butyric] acid ($C_4H_8O_2$), pentanoic [valeric] acid ($C_5H_{10}O_2$), decanoic [capric] acid ($C_{10}H_{20}O_2$), dodecanoic [lauric] acid ($C_{12}H_{24}O_2$), tetradecanoic [myristic] acid ($C_{14}H_{28}O_2$), hexadecanoic [palmitic] acid ($C_{16}H_{32}O_2$), octadecanoic [stearic] acid ($C_{18}H_{36}O_2$), eicosanoic [arachidic] acid ($C_{20}H_{40}O_2$) and docosanoic [behenic] acid ($C_{22}H_{44}O_2$).

Particularly preferred are autoxidisable polyester resins in which the autoxidisable groups are mainly derived from fatty acid residues, more preferably unsaturated fatty acid residues, most preferably fatty acid residues having two or more double bonds, especially conjugated fatty acid residues.

The crosslinking of the polyester resin herein is by autoxidation. In a preferred embodiment, metal ion crosslinking is used in combination with the autoxidation mechanism, e.g. by use of coordinative driers as is well known by those skilled in the art. Optionally (although less preferred) autoxidation is used in combination with other crosslinking mechanisms as are known in the art. Other crosslinking mechanisms known in the art include the reaction of alkoxy silane groups, Schiff base crosslinking, epoxy groups reacting with amino, carboxylic acid or mercapto groups, the reaction of amine or mercapto groups with ethylenically unsaturated groups such as fumarate and acryloyl groups, the reaction of masked epoxy groups with amino or mercapto groups, the reaction of isothiocyanates with amines, alcohols or hydrazines, the reaction of amines (for example ethylene diamine or multifunctional amine terminated polyalkylene oxides) with β-diketo (for example acetoacetoxy or acetoamide) groups to form enamines.

We have found that a minimal level of ring structures in the autoxidisable polyester resin is useful to reach the final coating properties.

Preferably the autoxidisable polyester resin comprises at least 5 wt %, more preferably at least 10 wt % of ring structures. Examples of suitable ring structures include rings originating from isophthalic acid, phthalic acid, hexahydrophthalic acid (and their anhydrides) and dimethylol cyclohexane. For the purpose of calculation of wt % rings only, irrespective of the exact structure, an aromatic ring ($C_6H_4$) has an Mn of 76 and an aliphatic ring ($C_6H_{10}$) has an Mn=82.

The presence of ring structures in the autoxidisable polyester resin has been found to improve final coating properties, such as hardness, block resistance and drying times.

The autoxidisable polyester resin may contain bound hydrophilic water-dispersing groups. These types of hydrophilic groups are well known in the art, and can be ionic water-dispersing groups or non-ionic water-dispersing groups. Preferred non-ionic water-dispersing groups are polyalkylene oxide groups, more preferably polyethylene oxide groups. A small segment of the polyethylene oxide group can be replaced by a propylene oxide segment and/or butylene oxide segment, however the polyethylene oxide group should still contain ethylene oxide as a major component. When the water-dispersible group is polyethylene oxide, the preferred ethylene oxide chain length is ≥4 ethylene oxide units, preferably ≥8 ethylene oxide units and most preferably ≥15 ethylene oxide units. Preferably the autoxidisable amide group containing resin if containing polyalkylene oxide groups has a polyethylene oxide content of >0%, more preferably ≥2%, most preferably ≥3.5% and especially preferably ≥5% by weight. Preferably the autoxidisable amide group containing resin has a polyethylene oxide content of ≤50% by weight, more preferably ≤30% by weight, most preferably ≤15% by weight and especially ≤9% by weight. Preferably the polyethylene oxide group has a Mw from 175 to 5000 g/mol, more preferably from 350 to 2200 g/mol and most preferably from 660 to 2200 g/mol.

Preferred ionic water-dispersing groups are anionic water-dispersing groups, especially carboxylic, phosphate, phosphonate or sulphonic acid groups. Most preferred are carboxylic or sulphonic acid groups. The anionic water-dispersing groups are preferably fully or partially in the form of a salt. Conversion to the salt form is optionally effected by neutralisation of the autoxidisable resin with a base, preferably during the preparation of the autoxidisable resin and/or during the preparation of the composition of the present invention. The anionic dispersing groups may in some cases be provided by the use of a monomer having an already neutralised acid group in the autoxidisable polyester resin synthesis so that subsequent neutralisation is unnecessary. If anionic water-dispersing groups are used in combination with a non-ionic water-dispersing group, neutralisation may not be required.

If the anionic water-dispersing groups are neutralised, the base used to neutralise the groups is preferably, an amine or an inorganic base. Suitable amines include tertiary amines, for example triethylamine or N,N-dimethylethanolamine. Suitable inorganic bases include alkali hydroxides and carbonates, for example lithium hydroxide, sodium hydroxide, or potassium hydroxide. Generally a base is used which gives the required counter ion desired for the composition. For example, preferred counter ions include $Li^+$, $Na^+$, $K^+$, $NH_4^+$ and substituted ammonium salts.

Cationic water dispersible groups can also be used, but are less preferred. Examples include pyridine groups, imidazole groups and or quaternary ammonium groups which may be neutralised or permanently ionised. Due to the influence that neutralisation agents have on yellowing, tertiary amines and/or LiOH, NaOH and KOH are especially preferred.

The autoxidisable polyester resin, if carboxylic acid functional, preferably has an acid value (AV) ≥20 mgKOH/g, more preferably ≥25 mg KOH/g and especially ≥30 mg KOH/g. The autoxidisable polyester resin preferably has an acid value of ≤65 mg KOH/g and more preferably ≤60 mg KOH/g.

The autoxidisable polyester resin, if carboxylic acid functional, preferably conforms to the following relationship:

NDxAV>22 mg KOH/g

More preferably NDxAV≥27 mg KOH/g and most preferably ≥33 mg KOH/g. Preferably NDxAV≤65 mg KOH/g, more preferably ≤60 mg KOH/g and most preferably ≤55 mg KOH/g.

ND (neutralization degree of the acid groups on the polymer) is defined as follows: if the level of neutralizing agent present in the resin is sufficient to neutralize for instance 80% of the acid groups, then the ND is 0.8. A resin with an acid value of 30 mg KOH/g and that is neutralised for 80% has a NDxAV value of 24 mg KOH/g.

The autoxidisable polyester resin preferably has a hydroxyl number of ≤70 mg KOH/g, more preferably ≤40 mg KOH/g, more preferably ≤25 mg KOH/g.

Preferably the weight average molecular weight (Mw) of the polyester resin is ≥3,500 g/mol and more preferably ≥5,000 g/mol. Preferably the weight average molecular weight (Mw) of the resin is ≤75,000 g/mol, more preferably ≤60,000 g/mol, most preferably ≤50,000 g/mol and especially ≤30,000 g/mol. Preferably the Mw is measured by GPC with polystyrene standards as described herein.

Preferably a significant part of any crosslinking reaction only takes place after application of the aqueous coating composition to a substrate, to avoid an excessive molecular weight build up which may lead to an increased viscosity of the aqueous coating composition on the substrate in the early stages of drying.

The molecular weight distribution (MWD) of the autoxidisable polyester resin has an influence on the viscosity of the resins in the composition and hence an influence on the telegraphing. MWD is conventionally described by the polydispersity index (PDi). PDi is defined as the weight average molecular weight divided by the number average molecular weight (Mw/Mn) where lower values are equivalent to lower PDi's. It has been found that a lower PDi often results in lower viscosities for a given Mw crosslinkable autoxidisable resin. Preferably the autoxidisable polyester resin has a PDi less than 20, more preferably less than 16 and more preferably less than 5.

Preferably the average particle diameter (i.e. the particle size—since the particles are essentially spherical) of the autoxidisable fatty acid modified polyester is <250 nm, more preferably <120 nm, most preferably <90 nm and especially <50 nm.

Preferably at least 80% of the particles have an average particle diameter <250 nm, more preferably <120 nm, most preferably <80 nm and especially below 50 nm. The particle diameter may be averaged by intensity (Z-average) and measured using a Zetasizer 3000HS from Malvern.

The glass transition temperature (Tg) of the autoxidisable polyester resin (100% solids) may vary within a wide range. The Tg (as measured by DSC) is preferably higher than −40° C., more preferably higher than −30° C. and especially higher than −25° C. The Tg preferably is less than 25° C., more preferably less than 15° C. and especially less than 5° C.

In case the Tg of the autoxidisable polyester resin can not be measured by DSC because the first derivative of the DSC curve does not show any identifiable maximum, an alternative method for determining the Tg is by calculating the Tg using the following equation that relates viscosity of the pure autoxidisable resin to its Tg (derived from the Williams-Landau-Ferry (WLF) equation):

$$Ln(\eta)=27.6-[40.2\times(T-Tg)]/[51.6+(T-Tg)]$$

where:
Ln(η)=Natural logarithm of the viscosity of the pure autoxidisable resin expressed in Pa·s (measured at 23° C.+/−1° C. using a shear rate between 0.005 and 1 $s^{-1}$);
T=23° C.+/−1° C. (temperature used to measure the viscosity of the pure resin);
Tg=glass temperature.

A generic polyester is formed by the condensation reaction of for examples molecules having acid or anhydride functionalities with molecules having alcohol and/or amine functionalities. By having more than one of such functional groups on one molecule, polymers may be formed. If an amine such as dialkanolamine is used the resulting polyester resin is generally named as "polyesteramide". By having even more functional groups on one molecule it is possible to form hyperbranched polyesters as are well known in the art. By including polyisocyanate components urethanised polyesters (also know as polyesterurethanes) may be formed.

Functional groups (such as a fatty acid residue or water-dispersing groups) may be introduced into the autoxidisable polyester resin using two general methods: i) by utilising in the polymerisation process to form an autoxidisable resin, monomers carrying the functional group; or ii) utilising monomers bearing selected reactive groups and which monomer is subsequently reacted with a compound carrying the functional group and also a reactive group of the type which will react with the selected reactive groups on the monomer to provide attachment of the functional group to the autoxidisable resin via covalent bonding.

The autoxidisable polyester resin, may be prepared using conventional polymerisation procedures known to be effective for polyester synthesis. General processes for the preparation of alkyd polyesters are described in "Alkyd Resin Technology" by T C Patton, Publisher John Wiley & sons Inc. (1962). General methods for preparing crosslinkable polyesters are also disclosed in EP 486092, U.S. Pat. No. 3,494,882, U.S. Pat. No. 4,251,406, EP 0000087, WO 95/02019, U.S. Pat. No. 5,378,757 and GB 2306489.

Thus, it is well known that polyesters, which contain carbonyloxy (i.e. —C(=O)—O—) linking groups may be prepared by a condensation polymerisation process in which monomers providing an "acid component" (including ester-forming derivatives thereof) is reacted with monomers providing a "hydroxyl component". The monomers providing an acid component may be selected from one or more polybasic carboxylic acids such as di- or tri-carboxylic acids or ester-forming derivatives thereof such as acid halides, anhydrides or esters. The monomers providing a hydroxyl component may be one or more polyhydric alcohols or phenols (polyols) such as diols, triols, etc. It is to be understood, however, that the polyester autoxidisable resin may contain, if desired, a proportion of carbonylamino linking groups —C(=O)—NH— (i.e. amide linking group) or —C(=O)—N—$R_2$ (tertiary amide linking group) by including an appropriate amino functional reactant as part of the hydroxyl component or alternatively all of the hydroxyl component may comprise amino functional reactants, thus resulting in a polyesteramide resin; such amide linkages are in fact useful in that they are more hydrolysis resistant.

There are many examples of carboxylic acids (or their ester forming derivatives such as anhydrides, acid chlorides, or lower alkyl esters) which can be used in polyester autoxidisable resin synthesis for the provision of the monomers providing an acid component. Examples include, but are not limited to monofunctional acids such as (alkylated) benzoic acid and hexanoic acid; and $C_4$ to $C_{20}$ aliphatic, alicyclic and aromatic dicarboxylic acids (or higher functionality acids) or their ester-forming derivatives. Specific examples include adipic acid, fumaric acid, maleic acid, succinic acid, itaconic acid, azeleic acid, sebacic acid, nonanedioic acid, decanedioic acid, 1,4-cyclohexanedicarboxylic acid, 1,3-cyclohexanedicarboxylic acid, 1,2-cyclohexanedicarboxylic acid, terephthalic acid, isophthalic acid, 5-sodiosulpho isophthalic acid, phthalic acid and tetrahydrophthalic acid. Anhydrides include succinic, maleic, phthalic, trimellitic and hexahydrophthalic anhydrides.

Similarly there are many examples of polyols which may be used in polyester autoxidisable resin synthesis for the provision of the monomers providing a hydroxyl component. The polyols preferably have from 1 to 6 (more preferably 2 to 4) hydroxyl groups per molecule. Suitable monofunctional alcohols include for example eicosanol and lauryl alcohol. Suitable polyols with two hydroxy groups per molecule include diols such as 1,2-ethanediol, 1,3-propanediol, 1,4-butanediol, 1,6-hexanediol, 2,2-dimethyl-1,3-propanediol (neopentyl glycol), the 1,2-, 1,3- and 1,4-cyclohexanediols and the corresponding cyclohexane dimethanols, diethylene glycol, dipropylene glycol, and diols such as alkoxylated bisphenol A products, e.g. ethoxylated or propoxylated bisphenol A. Suitable polyols with three hydroxy groups per molecule include triols such as trimethylolpropane (TMP) and 1,1,1-tris (hydroxymethyl)ethane (TME). Suitable polyols with four or more hydroxy groups per molecule include bis-TMP, pentaerythritol (2,2-bis(hydroxymethyl)-1,3-propanediol), bis-pentaerythritol and sorbitol (1,2,3,4,5,6-hexahydroxyhexane). Examples of hydroxyl functional amines with both hydroxyl functionality and amine functionality are described in, for example, WO 00/32708, use of diisopropanolamine is preferred. These can be used to prepare polyesteramide resins.

The esterification polymerisation processes for making the polyester autoxidisable resin for use in the invention composition are well known in the art and need not be described here in detail. Suffice to say that they are normally carried out in the melt optionally using catalysts such as tin-based catalysts and with the provision for removing any water (or alcohol) formed from the condensation reaction.

Preferably the autoxidisable polyester resin comprises <6 wt %, more preferably <3.5 wt %, most preferably <2 wt %, especially <1 wt % and most especially 0 wt % of glycerol. Reduced levels of glycerol in the polyester may improve outdoor durability.

Preferably the autoxidisable polyester resin comprises <15 wt %, more preferably <6 wt %, most preferably <3 wt % and especially 0 wt % of phthalic acid, phthalic anhydride and benzoic acid. Reduced levels of phthalic acid, phthalic anhydride and or benzoic acid in the polyester may improve the hydrolytical (backbone) stability.

Preferably if the polyester autoxidisable resin comprises carboxylic acid functionalities, they are derived from a polyacid and or anhydride.

Preferably the autoxidisable polyester resin comprises <5 wt %, more preferably <2 wt % and most preferably 0 wt % of TMA (trimellitic acid and or trimellitic anhydride). It has been found that the use of TMA tends to result in hydrolysis and less durability of the autoxidisable polyester resin.

In a preferred embodiment, the coating composition comprises at least an autoxidisable pure polyester resin obtained from components comprising:
i) 15 to 40 wt %, more preferably 21 to 35 wt % of isophthalic acid and or hexahydrophthalic anhydride (HH-PAN);
ii) 0 to 2 wt %, more preferably 0 wt % of glycerol;
iii) 30 to 70 wt %, preferably 38 to 65 wt % and most preferably 43 to 60 wt % of fatty acid residues having an iodine value between 50 and 180 g $I_2$/100 g;
wherein i)+ii)+iii)=100%;
wherein the fatty acid contains less than 10 wt % of fatty acids that contain 3 or more double bonds;
wherein the ND×AV value of the pure autoxidisable polyester resin is in the range of from 22 to 65, more preferably 27 to 57 and most preferably 33 to 45 mg KOH/g;
wherein the autoxidisable pure polyester resin comprises <5 wt %, more preferably <2 wt % and most preferably 0 wt % of TMA (trimellitic acid and or trimellitic anhydride);
wherein the composition comprises <13 wt % N-methylpyrrolidone on solids; and
wherein the composition has a pH in the range of from 5.1 to 9.2, more preferably in the range of from 5.1 and 8.4 and most preferably in the range of from 6.5 to 7.6.

It is also possible to react a polyester or polyesteramide that is still hydroxyl functional with isocyanates (for example 1 to 20 wt % of isocyanates, more preferably 1 to 12 wt % and especially 1 to 7 wt % on solids) to give a urethanised polyester or urethanised polyesteramide (both together are herein also described as a urethanised polyester(-amide) i.e. the amide group presence is optional). The use of diisocyanates, to for example increase the molecular weight is preferred. This may also have a positive effect on the hydrolytical stability and drying rate of the resulting resins.

Suitable polyisocyanates include aliphatic, cycloaliphatic, araliphatic, aromatic and/or polyisocyanates modified by the introduction of urethane, allophanate, urea, biuret, carbodiimide, uretonimine, urethdione or isocyanurate residues. Examples of suitable polyisocyanates include ethylene diisocyanate, 1,6-hexamethylene diisocyanate, isophorone diisocyanate, cyclohexane-1,4-diisocyanate, 4,4'-dicyclohexylmethane diisocyanate, p-xylylene diisocyanate, α,α'-tetramethylxylene diisocyanate, 1,4-phenylene diisocyanate, 2,4-toluene diisocyanate, 2,6-toluene diisocyanate, 4,4'-diphenylmethane diisocyanate, polymethylene polyphenyl polyisocyanates, 2,4'-diphenylmethane diisocyanate, 3(4)-isocyanatomethyl-1-methyl cyclohexyl isocyanate, 1,5-naphthylene diisocyanate and mixtures thereof.

Preferred polyisocyanates are isophorone diisocyanate, 4,4'-dicyclohexylmethane diisocyanate, toluene diisocyanate and 4,4'-diphenylmethane diisocyanate.

Preferably, a hydroxyl- or carboxyl-terminated autoxidisable urethanised polyester may be prepared directly by reacting the reactants in proportions corresponding to a ratio of isocyanate groups to isocyanate-reactive groups of at least 0.05:1, more preferably at least 0.1:1 and preferably a ratio of isocyanate groups to isocyanate-reactive groups of less than 1.0:1, more preferably less than 0.85:1, most preferably less than 0.75:1 and especially less than 0.5:1.

Alternatively, an isocyanate-reactive autoxidisable polyester is first reacted with a polyisocyanate, followed by acid functionalisation to provide additional stabilising groups.

If desired, catalysts such as dibutyltin dilaurate and stannous octoate, zirconium or titanium based catalysts may be used to assist the urethanisation reaction.

Preferably the concentration of fatty acid residues in the autoxidisable polyesteramide resin or autoxidisable urethanised polyester(-amide) resin is ≥33 wt %, more preferably ≥38 wt %, most preferably ≥43 wt % by weight based on the weight of the resin.

Preferably the concentration of fatty acid residues in the autoxidisable polyesteramide resin or autoxidisable urethanised polyester(-amide) resin is ≤59 wt %, and especially ≤52 wt % by weight based on the weight of the resin.

Preferably the weight average molecular weight (Mw) of the autoxidisable polyesteramide resin or autoxidisable urethanised polyester(-amide) resin is ≤20,000 g/mol, more preferably ≤12,000 g/mol and most preferably <9,000 g/mol.

Preferably the autoxidisable polyesteramide resin or autoxidisable urethanised polyester(-amide) resin has a PDi less than 8, more preferably a PDi less than 5.5, most preferably a PDi less than 4.0.

Preferably the autoxidisable polyesteramide resin or autoxidisable urethanised polyester(-amide) resin has a carbonyl amine content (defined as the presence of NH—C=O or N—C=O in mmoles/100 gr solid resin) of at least 10 mmoles/100 g solid resin, more preferably at least 20 mmoles/100 g, most preferably at least 50 mmoles/100 g solid resin and especially at least 65 mmoles/100 g solid resin.

In addition the autoxidisable polyesteramide resin or autoxidisable urethanised polyester(-amide) resin preferably has a carbonyl amine content (defined as the presence of NH—C=O or N—C=O in mmoles/100 g solid resin) of less than 500 mmoles/100 g solid resin, more preferably less than 400 mmoles/100 g solid resin, most preferably less than 300 mmoles/100 g solid resin and especially less than 225 mmoles/100 g solid resin.

Preferably the coating composition comprising the autoxidisable polyesteramide resin or autoxidisable urethanised polyester(-amide) resin has a co-solvent content >1% by weight of total composition.

Preferably the composition comprising the autoxidisable polyesteramide resin or autoxidisable urethanised polyester(-amide) resin contains less than 5 wt % heterocyclic nitrogen containing solvents like NMP, more preferably less than 2 wt % and most preferably is substantially free of NMP.

In a further preferred embodiment, the coating composition comprises an autoxidisable urethanised polyester(-amide) resin obtained from components comprising:
  i) 10 to 45 wt %, more preferably 20 to 40 wt % of a cyclic anhydride, preferably this anhydride is hexahydrophthalic anhydride (HHPAN);
  iii) 33 to 65 wt %, more preferably 38 to 62 wt %, most preferably 42 to 59 wt % of fatty acid residues having an iodine value between 80 and 155 g $I_2$/100 g;
    wherein the fatty acid residues contain less than 10 wt % of fatty acid residues that contain 3 or more double bonds;
  iv) 10 to 35 wt % of a hydroxyl functional amine;
  v) 0.5 to 7 wt %, of a polyisocyanate;
  wherein i)+ii)+iii)+iv)+v)=100%;
  wherein the ND×AV value of the autoxidisable urethanised polyester(-amide) resin is in the range of from 22 to 65 and more preferably 35 to 60 mg KOH/g;
  wherein the autoxidisable urethanised polyester(-amide) resin preferably comprises <5 wt %, more preferably <2 wt % and most preferably 0 wt % of TMA (trimellitic acid and or trimellitic anhydride).

The autoxidisable polyester resin may be dispersed in water using techniques well known in the art. The autoxidisable polyester resin normally does not require the use of an external surfactant (a type of dispersing agent) when being dispersed into water because it contains polymer bound dispersing groups. Surfactants may be utilised in order to assist in the dispersion of the autoxidisable polyester resin in water. Suitable surfactants include but are not limited to conventional anionic, cationic and/or non-ionic surfactants such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$ alkyl sulphates, alkali metal salts of sulphonic acids; fatty alcohols, ethoxylated fatty acids and/or fatty amides, and Na, K and $NH_4$ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Cationic surfactants include alkyl or (alk)aryl groups linked to quaternary ammonium salt groups. Non-ionic surfactants include polyglycol ether compounds and polyethylene oxide compounds. The surfactants may also be polymeric surfactants which are also described as wetting agents.

If used, the amount of total surfactants used is preferably at least 0.1%, more preferably at least 1% by weight and preferably less than 7%, more preferably less than 4% and most preferably less than 2% by weight based on the weight of the total resin material. Preferably a mixture of anionic and non-ionic surfactants is used.

Dispersing resins (another type of dispersing agent) such as W-3000 available from Perstorp or as described in EP 1870442 could also be employed instead of or in combination with more conventional surfactants.

Preferably to reduce the effect of cissing, the composition comprising an autoxidisable polyester resin uses <5 wt %, more preferably <3 wt %, most preferably <1.5 wt % and especially is substantially free of surfactant by weight of resin solids.

Preferably the composition if comprising anionic surfactant, comprises an anionic surfactant having less than 90 wt % ethylene oxide (EO) groups, more preferably less than 70 wt % and most preferably less than 55 wt %. Preferably the composition if comprising anionic surfactant, comprises an anionic surfactant having more than 10 wt % EO groups and more preferably more than 20 wt % EO groups.

Preferably the composition if comprising anionic surfactant, comprises an anionic surfactant having sulphate, sulphonate, phosphate or phosphonate groups.

Preferably the composition if comprising anionic surfactant, comprises an anionic surfactant having phosphate or phosphonate groups.

Preferably the aqueous coating composition has a pH >5.1, more preferably >6.5. Preferably the composition has a pH <9.2, more preferably <8.4 and especially <7.6.

An organic solvent may optionally be added before, during and/or after the polymerisation process for making the polyester autoxidisable resin and the aqueous coating composition to control the viscosity. Examples of solvents include water-miscible solvents such as propylene glycol based solvents, especially propylene glycol mono methyl ether and dipropylene glycol mono methyl ether and glycol ethers such as butyldiglycol. Optionally no organic solvents are added.

A co-solvent, as is well known in the coating art, is an organic solvent employed in an aqueous composition to ameliorate the drying characteristics thereof, and in particular to lower its minimum film forming temperature. The co-solvent may be solvent incorporated or used during preparation of the autoxidisable resin or may have been added during formulation of aqueous solution coating composition.

Preferably the aqueous coating composition has a co-solvent content <10 wt %, more preferably <6 wt % and most preferably <3.5 wt % by weight of the total composition.

Preferably the aqueous coating composition has a co-solvent content >0 wt %, more preferably >1 wt % and most preferably >2 wt % by weight of the total composition.

An advantage of the current invention is that co-solvent can, as is often required for environmental and safety reasons, be present at a very low concentrations because of the plasticising nature of the autoxidisable resin.

In general, aromatic or heterocyclic nitrogen-containing ligands (except pyridine) or aromatic and aliphatic primary and secondary (di)amines were found to prolong the drying time to a considerable extent (as reported in Coordination Chemistry Reviews 249 (2005) 1709-1728). An example includes heterocyclic nitrogen-containing solvents such as N-methylpyrrolidone (NMP) and N-ethylpyrrolidone.

Preferably the aqueous coating composition comprises <13 wt %, more preferably <10 wt %, most preferably <5 wt % and especially <0.5 wt % of NMP calculated on the resin solids of the coating composition.

More preferably the aqueous coating composition comprises <13 wt %, more preferably <8 wt %, most preferably <5 wt % and especially <0.5 wt % on resin solids of nitrogen containing molecules with an evaporation rate <0.1 more preferred <0.05 (compared to Butylacetate=1.0), which are either aromatic, heterocyclic or which are aromatic and aliphatic primary and secondary (di)amines with the proviso that the wt % of nitrogen in such molecules is >5 wt % and more preferably >10 wt %.

Values for evaporation rates were published by Texaco Chemical Company in a bulletin Solvent Data; Solvent Properties (1990). These values are relative to the evaporation rate of n-butylacetate for which the evaporation rate is defined as 1.00. Determination of evaporation rates of solvents not listed in this bulletin is as described in ASTM D3539.

The drying process of the aqueous coating composition can be divided into stages for example the period of time necessary to achieve dust-free and or tack-free coatings using the tests described herein.

Preferably the dust-free time of the aqueous coating composition is ≤6 hours, more preferably ≤2 hours and most preferably ≤50 minutes.

Preferably the tack-free time of the aqueous coating composition is ≤10 hours, more preferably ≤8 hours and most preferably ≤6 hours. Preferably the aqueous coating composition when coated onto a substrate is water resistant for 30 minutes, more preferably for 1 hour and most preferably for 3 hours after 24 hrs of drying the coating.

Preferably the aqueous coating composition when coated onto a substrate is block resistant at room temperature with a rating of 3 or more and more preferably the coating is block resistant at 52° C. with a rating of 3 or more after 24 hrs drying.

The autoxidisable polyester resin of the invention preferably contributes to >50 wt %, preferably at least 80 wt %, more preferably at least 90 wt % and most preferably 100 wt % of all solid resin material used in the coating.

The autoxidisable polyester resin solids content of the aqueous coating composition of the invention is preferably ≥35 wt % and more preferably ≥40 wt %. The upper limit of solids content is usually ≤72 wt %, more preferably ≤65 wt % and especially ≤63 wt %.

If desired the aqueous dispersion of the invention can be used in combination with other polymer dispersions or solutions which are not according to the invention.

Preferably <35 wt %, more preferably <20 wt %, most preferably <10 wt % and especially <4 wt % on total resin solids is used of resin dispersions or solutions not according to the invention. Mixtures of resins according to the invention can be used as well, where examples include mixtures based on autoxidisable vinyl polymers, polyester and/or polyamide resins.

The aqueous coating composition of the invention is particularly useful as or for providing the principle component of coating formulations (i.e. composition intended for application to a substrate without further treatment or additions thereto) such as protective or decorative coating compositions (for example paint, lacquer or varnish) wherein an initially prepared composition optionally may be further diluted with water and/or organic solvents, and/or combined with further ingredients or may be in more concentrated form by optional evaporation of water and/or organic components of the liquid medium of an initially prepared composition.

The aqueous coating composition of the invention may be applied to a variety of substrates including wood, board, metals, stone, concrete, glass, cloth, leather, paper, plastics, foam and the like, by any conventional method including brushing, dipping, flow coating, spraying, and the like. They are, however, particularly useful for providing coatings on wood and board substrates. The aqueous carrier medium is removed by natural drying or accelerated drying (by applying heat) to form a coating. Accordingly in a further embodiment of the invention there is provided a coating obtainable from an aqueous coating composition of the present invention.

The aqueous coating composition of the invention may contain other conventional ingredients including pigments, dyes, emulsifiers, surfactants, plasticisers, thickeners, heat stabilisers, levelling agents, anti-cratering agents, fillers, sedimentation inhibitors, UV absorbers, antioxidants, dispersants, reactive diluents (preferably any reactive diluents have an Mn >1000 g/mol, more preferably >1500 g/mol and most preferably >2000 g/mol and preferably an Mn <5000 g/mol, more preferably <4000 g/mol and especially <3500 g/mol; preferably any reactive diluents comprise 60 to 90 wt %, more preferably 75 to 90% of fatty acid residues with an iodine value in the range of 50 to 175, more preferred 80 to 150 g $I_2$/100 g resin) waxes, neutralising agents, adhesion promoters, defoamers, co-solvents, wetting agents and the like introduced at any stage of the production process or subsequently. It is possible to include fire retardants like antimony oxide in the dispersions to enhance the fire retardant properties.

In particular, the aqueous coating compositions of the invention and formulations containing them advantageously include a drier salts. Drier salts are well known to the art for further improving curing in unsaturated film-forming substances. Generally speaking, drier salts are metallic soaps, that is salts of metals and long chain carboxylic acids. It is thought that the metallic ions effect the curing action in the film coating and the fatty acid components confer compatibility in the coating medium. Examples of drier metals are cobalt, manganese, zirconium, lead, neodymium, lanthanum and calcium. The level of drier salts in the composition is typically that to provide an amount of metals within the range of from 0.01 to 0.5% by weight based on the weight of autoxidisable polyester resin.

Drier salts are conventionally supplied as solutions in solvents for use in solvent-borne alkyd systems. They may, however, be used quite satisfactorily in aqueous coating compositions since they can normally be dispersed in such systems fairly easily. The drier salts may be incorporated into the aqueous coating composition at any convenient stage. For example the drier salts may be added prior to dispersion into water. Drier accelerators may be added to the drier salts. Suitable drier accelerators include 2,2'-bipyridyl and 1,10-phenanthroline.

Preferably the aqueous coating composition is a one component system, meaning that preferably no additional crosslinking agents, like for instance polyaziridines, polycarbodiimides or polyisocyanates or melamines are added to the aqueous coating composition, prior to the application of the coating to a substrate.

Preferably the aqueous coating composition is free from photoinitiators and is cured without the use of radiation curing equipment.

In an embodiment of the present invention there is provided an aqueous coating composition comprising:
  i) 35 to 65 wt % of the autoxidisable polyester resin as described herein;
  ii) 0 to 20 wt %, more preferably 0 to 15 wt %, most preferably 0 to 10 wt %, and especially 1 to 5 wt % of co-solvent; and
  iii) 35 to 65 wt % of water;
  where i)+ii)+iii)=100%.

Each part therefore is by weight of the total composition.

In a further embodiment of the present invention there is provided an aqueous coating composition comprising:
  i) 10 to 40, more preferably 15 to 35 wt % of pigment, more preferably of $TiO_2$;
  ii) 10 to 40, more preferably 15 to 35 wt % of the autoxidisable polyester resin as described herein;
  iii) 20 to 70 wt % of water; and
  iv) 0 to 15 wt %, more preferably 0 to 10, most preferably 0 to 7 and especially 1 to 2.5 wt % of co-solvent;
  where i)+ii)+iii)+iv)=100%; and
  v) 0 to 2.5 wt %, more preferably 0.1 to 2 wt % of thickener by weight of solids; and
  vi) 0 to 5 wt % of dispersing agent by weight of solids.

Preferably when the aqueous coating composition is formulated as a paint, the composition comprises 2 to 10 wt % of co-solvent on paint solids, preferably 3 to 9 wt % of co-solvent, of which at least 50 wt %, preferably at least 80 wt % and most preferably at least 95 wt % has an evaporation rate higher then 0.012, more preferably higher then 0.018 and an evaporation rate lower then 0.25 and more preferably lower then 0.21 (when compared to BuAc=1.0).

The present invention is now illustrated by reference to the following examples. Unless otherwise specified, all parts, percentages and ratios are on a weight basis. The prefix C before an example denotes that it is comparative. The term "working" means that the example is according to the invention. The term "non-working" means that it is not according to the invention (i.e. comparative).

Test Methods:

Telegraphing:

Two types of PVC substrates were used to determine the degree of telegraphing of an unpigmented coating comprising the autoxidisable resin:

1. Rough PVC substrate with a well defined and uniform rough surface available from Vink Kunststoffen B. V Didam, Holland; type Vikupor white JD11; 2 mm thickness.
   Surface analysis was carried out using a Wyko optical profilometer NT1100, and analysis of an area of 1.9× 2.5 mm, using a magnification of 2.5 resulted in Rz=25±5 μm (Rz is the Ten-Point Height, this is the average of the five greatest peak-to-valley separations in the scanned area and is regarded as a general value for surface roughness.)
2. Smooth PVC substrate with a well defined smooth surface available from Vink Kunstoffen B. V. Didam, Holland; Vikunyl PVC film white glossy type 206221, 3 mm thickness. Surface analysis using a Wyko optical profilometer NT1100, and analysis of an area of 1.9×2.5 mm, using a magnification of 2.5 resulted in Rz=1+/−0.25 μm.

The unpigmented coating comprising (optionally comprising flow and wetting agents and thickeners if needed) was cast on both PVC substrates (rough and smooth) and a smooth and defect free film was obtained, resulting in a theoretical dry film thickness between 52 μm+/−6 μm. The film was dried at relative humidity levels of 50+/−5%, temperatures of 23+/−2° C. and an air flow of <0.1 m/s for 24 hrs and the gloss was measured at a 20° angle, this gloss measurement was repeated after 4 days, 7 days and 14 days. The difference in gloss readings between the films on rough and smooth PVC is a quantitative measure with respect to what degree the rough surface of the PVC is telegraphed to the surface of the dried coating. The difference in gloss readings between the films on the rough and smooth PVC substrate are interpreted as follows: the smaller the difference in gloss values, the smaller the degree of telegraphing and the better the coating hides the substrate roughness.

Gloss Measurement Method:

Gloss measurements were carried out on a BYK Gardner micro-TRI-gloss 20-60-85 glossmeter in accordance with ASTM D523-89.

Drying Time:

To test the dust-free and tack-free drying stages of the aqueous compositions prepared in the examples as described below, the aqueous composition was formulated and applied to a glass plate at a wet film thickness of 80 μm. Drying time tests were performed at regular time intervals at relative humidity levels of 50+/−5%, temperatures of 23+/−2° C. and an air flow ≤0.1 m/s.

Dust-Free Time:

The dust-free time was determined by dropping a piece of cotton wool (about 1 cm$^3$ i.e. 0.1 g) onto the drying film from a distance of 25 cm. If the piece of cotton wool could be immediately blown from the substrate by a person without leaving any wool or marks in or on the film, the film was considered to be dust-free.

Tack-Free Time:

The tack-free time was determined by placing a piece of cotton wool (about 1 cm$^3$, 0.1 g) on the drying film and placing a weight of 1 kg with a diameter 4.8 cm onto the piece of cotton wool (for 10 seconds). If the piece of cotton wool could be removed from the substrate by hand without leaving any wool or marks in or on the film, the film was considered to be tack-free.

König Hardness

König hardness was determined following DIN 53157 NEN 5319 using an Erichsen hardness equipment. The values are given in seconds (s). Preferably the unpigmented aqueous composition of the invention has a König hardness of at least 80 seconds after 5 weeks.

Measurement of Film Yellowing:

The yellowing of a coating exposed to daylight or darkness for a specified time period was determined using a Dr Lange Spectropen. The equipment was calibrated to the defined values of the calibration plate and then the b-value was measured according to the CIE L, a, b method. The dark-yellowing is defined as the increase in the yellowness (Δb) of the coating during storage at 52° C. and in the dark for 21 days.

Molecular Weight Determination:

Gel permeation chromatography (GPC) analyses for the determination of polymer molecular weights were performed on an Alliance Waters 2695 GPC with three consecutive PL-gel columns (type Mixed-B, I/d=300/7.5 mm) using tetrahydrofuran (THF, HPLC grade, stabilized with 3,5-Di-tert-Butyl-4-Hydroxytoluene (BHT), preferably with 1.0 vol % acetic acid) as the eluent at 1 cm$^3$/min and using an Alliance Waters 2410 refractive index detector. A set of polystyrene standards (analysed according to DIN 55672) was used to calibrate the GPC. Samples corresponding to about 16 mg of solid material were dissolved in 8 cm$^3$ of THF. The samples were regularly shaken and dissolved for at least 24 hours for complete "uncoiling" and placed on the auto-sampling unit of the Alliance Waters 2695. The injection volume was 150 μL and the column oven was established at 35° C.

Glass Transition Temperature

Differential Scanning Calorimetry (DSC) was used to measure the Tg using the TA Instruments DSC Q1000 with the standard TA Instruments alumina cups of 50 μl. Flow rate was 50 ml/min nitrogen, the sample was loaded at a temperature range 20 to 25° C. The sample was equilibrated at −90° C. and then heated with 10° C./min to 100° C., kept for 5 minutes at 100° C., cooled to −90° C. with 20° C./min, kept for 5 minutes at −90° C. and subsequently heated with 10° C./min to 100° C. For sample preparation 80 to 100 μm of the resin or paint was cast on a glass plate and dried for 24 hrs in a vacuum oven at 40 to 50° C. using a reduced pressure below 20 mbar and after drying, sufficient film was removed and transferred to the alumina cup for subsequent DSC measurement.

Water Resistance:

A 100 μm wet film was cast on a Leneta chart and dried for 24 hrs at 23° C.+/−2° C. at a relative humidity of 50%+/−5% and an air flow of 0.1 m/s. Then three drops of water were placed on the film and one drop of water was removed after 30 minutes, one after 1 hour and one after 3 hours. The water resistance was assessed immediately after removal of the water [A] and after 24 hours [B]. The rating for water resistance is from 0=very poor, dissolved, 3=acceptable, 5=excellent, no damage of the coating.

EXAMPLE 1

Autoxidisable Urethanised Hyperbranched Polyester Amide

A 2 liter, five-necked reactor flask fitted with a stirrer, a thermometer and a condenser fitted with a Dean-Stark condensate trap, was loaded with diisopropanolamine (223 g) and hexahydrophthalic anhydride (184.5 g). The reaction mixture was gradually heated under a nitrogen atmosphere to 150° C. Subsequently sunflower fatty acid (442 g) was added and the mixture was gradually heated to 150° C. and kept at this temperature while reaction water was collected by applying vacuum. The reaction was stopped when the acid value was 5.2 mg KOH/g and cooled to 110° C. The hydroxyl value was 79.3 mg KOH/g. Subsequently hexahydrophthalic anhydride (145.9 g) was added to the reaction mixture and this mixture was kept on this temperature until virtually all anhydride was reacted as judged from the Infra Red spectrum of the reaction mixture (the anhydride groups typically show two absorptions at 1785 cm$^{-1}$ and 1865 cm$^{-1}$, which disappeared and were replaced by a new ester carbonyl absorption at 1740 cm$^{-1}$). To this mixture isophorone diisocyanate (14.4 g) was added and reacted at 90° C. until all free isocyanate groups had disappeared.

To the urethanised fatty acid functional hyperbranched polyester amide (607.1 g) butylglycol (151.8 g) and triethylamine (56.7 g) was added, corresponding with a neutralisation degree ND of 0.95.

Subsequently water (702 g) was added to this mixture to obtain an aqueous composition. The properties are listed in Table 1 below.

EXAMPLE 2

Autoxidisable Urethanised Hyperbranched Polyester Amide

A 2 liter, five-necked reactor flask fitted with a stirrer, a thermometer and a condenser fitted with a Dean-Stark condensate trap, was loaded with diisopropanolamine (186.5 g) and hexahydrophthalic anhydride (154.2 g). The reaction mixture was gradually heated under a nitrogen atmosphere to 150°. Subsequently sunflower fatty acid (405.5 g) was added and the mixture was gradually heated to 150° C. and kept at this temperature while reaction water was collected by applying vacuum. The reaction was stopped when the acid value was 5.7 mg KOH/g and cooled to 110° C. The hydroxyl value was 61.9 mg KOH/g. 356.1 g of the reaction was used for the following step where hexahydrophthalic anhydride (43.9 g) was added to the reaction mixture and this mixture was kept on this temperature until virtually all anhydride was reacted as judged from the Infra Red spectrum of the reaction mixture (the anhydride groups typically show two absorptions at 1785 cm$^{-1}$ and 1865 cm$^{-1}$, which disappeared and were replaced by a new ester carbonyl absorption at 1740 cm$^{-1}$). To this mixture isophorone diisocyanate (7.2 g) was added and reacted at 90° C. until all free isocyanate groups had disappeared. The urethanised fatty acid functional hyperbranched polyester amide was diluted with butylglycol (45.3 g). To this solution (357.5 g) triethylamine (21.1 g) was added, corresponding with a neutralisation degree ND of 0.95.

Subsequently water (387.5 g) was added to this mixture to obtain an aqueous composition. The properties are listed in Table 1 below.

EXAMPLE 3

Autoxidisable Pure Polyester

A 2 liter, five-necked reactor flask fitted with a stirrer, a thermometer and a condenser fitted with a Dean-Stark condensate trap, was loaded with isophthalic acid (165.2 g), 2,2-Bis(hydroxymethyl)-1,3-propanediol (168.6 g), Tall oil fatty acid (461.1 g) and xylene (103.0 g). The reaction mixture was gradually heated under a nitrogen atmosphere to 220° C. and kept at this temperature while reaction water was collected. The reaction was stopped when the acid value was 0.7 mg KOH/g and xylene was distilled of by applying vacuum. The hydroxyl value was 92.4 mg KOH/g. Subsequently hexahydrophthalic anhydride (31.3 g) was added to a part of the reaction product (257.0) and this mixture was heated to 110° C. and kept on this temperature until virtually all anhydride was reacted as judged from the Infra Red spectrum of the reaction mixture (the anhydride groups typically show two absorptions at 1785 cm$^{-1}$ and 1865 cm$^{-1}$, which disappeared and were replaced by a new ester carbonyl absorption at 1740 cm$^{-1}$).

To the fatty acid functional polyester (288.3 g) dipropylene glycol monomethyl ether (72.1 g) and triethylamine (19.7 g) was added, corresponding to a neutralisation degree ND of 0.95.

Subsequently water (494.2 g) was added to this mixture to obtain an aqueous composition. The properties are listed in Table 1 below.

TABLE 1

|  | Example 1 | Example 2 | Example 3 |
|---|---|---|---|
| Solids [%] | 40.0 | 43.1 | 35.0 |
| pH | 8.66 | 9.18 | 7.90 |
| Viscosity (mPa · s)[1] | 1680 | 28000 | 12800 |
| Particle size (nm) | 15.7 | 17.1 | 218.8 |
| Solvent content on total composition [%] | 10.0 | 5.3 | 9.0 |
| Fatty acid residue content on solids [%] | 43.4 | 47.4 | 52.2 |
| AV Resin [mgKOH/g] | 54.1 | 38.3 | 39.9 |
| AV × ND [mgKOH/g] | 51.4 | 36.3 | 37.9 |
| OH# Resin [mgKOH/g] | 2.3 | 6.0 | 53.2 |
| Mn | 1401 | 1898 | 1941 |
| Mw | 5338 | 5674 | 27803 |
| PDi | 3.8 | 3.0 | 14.0 |
| Amide group content [mmoles/100 g] | 188 | 190 | 0 |
| Tg [° C.] | −9.0 | −22.0 | −13.0 |

[1]Brookfield RVT viscosity measured with spindle #2.

EXAMPLE 4

Paint Formulation Based on Example 1

A paint formulation was prepared based on the urethanised hyperbranched polyester amide as described in Example 1. The formulation was prepared by mixing the components listed Table 2 below. The paint formulation had a yellowing Δb of 8.7.

TABLE 2

| Ingredient | Amount (g) | Supplier |
|---|---|---|
| Example 1 | 64.7 | — |
| Demineralised water | 6.4 | — |
| Uralac AD-35 | 1.0 | Pigment dispersant from DSM NeoResinsBV |
| Byk 024 | 0.2 | Wetting agent from Byk Chemie |
| Kronos 2190 | 21.5 | Pigment from Kronos |
| Additol VXW4940/demi water (1:1) | 1.0 | Dryer from Surface Specialties |
| Acrysol RM2020 | 3.3 | Thickener from Rohm & Haas |
| Borchigel L75N/demi water (1:1) | 1.8 | Thickener from Borchers |
| Byk 348 | 0.1 | Silicone surfactant from Byk Chemie |
| Total | 100.0 | |

The resulting dispersions for each example were siccativated using the drier mixture VWX4940 from Condea Servo, diluted 1:1 with water, 1.7 (+/−0.1) wt % of this mixture was added to the dispersion. A film was cast from each composition on glass and tested as described herein. The film properties are listed in Table 3 below.

TABLE 3

|  |  | Example 1 | Example 2 | Example 3 | Example 4 |
|---|---|---|---|---|---|
| Dust-free [minutes] | | 45.0 | 45.0 | 225.0 | 90.0 |
| Tack-Free [minutes] | | 420.0 | 480-960 | 360.0 | 330.0 |
| Water resistance [A] | | 4-4-4 | 4-4-4 | 4-4-4 | 5-5-4 |
| Water resistance [B] | | 4.5-4.5-4 | 4.5-4.5-4.5 | 4-4-4 | 5-5-4.5 |
| Gloss on rough PVC | 24 hours | 83.5 | 85 | 85.8 | 80.5 |
| | 4 days | 84.1 | 83.4 | 80.8 | 78.3 |
| | 1 week | 83.8 | 82.1 | 77.1 | 76.5 |
| | 2 weeks | 79.8 | 80.9 | 71.5 | 72.7 |
| Gloss on smooth PVC | 24 hours | 85.3 | 85.2 | 87.5 | 82.0 |
| Telegraphing value | 24 hours | 1.8 | 0.2 | 1.7 | 1.5 |
| König Hardness [s] | 24 hours | 19 | 23 | 10 | 9 |
| | 4 days | 63 | 56 | 17 | 35 |
| | 1 week | 63 | 61 | 22 | 29 |
| | 2 weeks | 84 | 74 | 30 | 46 |
| | 3 weeks | 95 | 85 | — | 59 |
| | 5 weeks | — | — | 96 | — |

The invention claimed is:

1. An aqueous coating composition comprising an autoxidisable urethanised polyesteramide resin which comprises <5 wt % of trimellitic acid and/or trimellitic anhydride, wherein the autoxidisable urethanised polyesteramide resin is obtained from components comprising:
   i) 10 to 45 wt % of a cyclic anhydride;
   iii) 33 to 65 wt % of fatty acid residues having an iodine number between 80 and 155 g I$_2$/100 g fatty acid, wherein the fatty acid residues contain less than 10 wt % of fatty acid residues that contain 3 or more double bonds;
   iv) 10 to 35 wt % of a hydroxyl functional amine; and
   v) 0.5 to 7 wt % of a polyisocyanate; wherein
   i)+iii)+iv)+v)=100%; and wherein
   the autoxidisable urethanised polyesteramide resin has:
   (I) a ND×AV value which is in a range of from 22 to 65 mg KOH/g, where ND is a neutralization degree of the acid groups and AV is an acid value of the autoxidisable urethanised polyesteramide resin;

(II) a Tg in the range of from −60° C. to +35° C.;
(III) an acid value greater than 15 mg KOH/g and less than 75 mg KOH/g; and
(IV) a Mw in the range of from 2,500 to 100,000 g/mol; wherein said composition has:
a) a co-solvent content ≤15 wt % based on the total weight of the composition;
b) a solids content >30 wt %; and wherein said composition when in the form of a film has a telegraphing value of less than 20 gloss units;
where the telegraphing value is the difference between an initial smooth gloss value minus an initial rough gloss value of the film, where the initial smooth gloss value is the gloss when the film is cast on smooth PVC (Rz=1 μm [±0.25 μm]);
the initial rough gloss value is the gloss when the film is cast on rough PVC (Rz=25 μm [±5 μm]); and wherein each film has a dry film thickness of 52 μm [±6 μm]; and each initial gloss value is measured at a 20° angle, one day (24 h) after the film has been cast.

2. An aqueous coating composition according to claim 1, wherein the ND×AV value of the autoxidisable urethanised polyesteramide resin is 27 to 57 mg KOH/g.

3. An aqueous coating composition according to claim 1, wherein the composition comprises <13 wt % N-methylpyrrolidone based on the total weight of resin solids in the composition.

4. An aqueous coating composition according to claim 1, wherein the autoxidisable urethanised polyesteramide resin comprises at least 5 wt % of ring structures.

5. An aqueous coating composition according to claim 1, wherein the autoxidisable urethanised polyesteramide resin comprises <15 wt % of phthalic acid, phthalic anhydride and/or benzoic acid.

6. An aqueous coating composition according to claim 1, wherein the fatty acid residues have an iodine number between 100 and 150 g $I_2$/100 g fatty acid.

7. An aqueous coating composition according to claim 1, wherein the autoxidisable urethanised polyesteramide resin comprises 1 to 7 wt % of isocyanates based on the total weight of resin solids in the composition.

8. An aqueous coating composition according to claim 1, wherein the autoxidisable urethanised polyesteramide resin has an amide group content of at least 15 mmoles/100 g solid resin.

9. An aqueous coating composition according to claim 1 comprising:
 i) 35 to 65 wt % of the autoxidisable urethanised polyesteramide resin;
 ii) 0 to 20 wt % of the co-solvent; and
 iii) 35 to 65 wt % of water; wherein
 i)+ii)+iii)=100%.

10. An aqueous coating composition according to claim 1, comprising:
 i) 10 to 40 wt % of pigment;
 ii) 10 to 40 wt % of the autoxidisable urethanised polyesteramide resin;
 iii) 20 to 70 wt % of water; and
 iv) 0 to 15 wt % of the co-solvent;
 v) 0 to 2.5 wt % of thickener based on the weight of the solids; and
 vi) 0 to 5 wt % of dispersing agent based on the weight of the solids, wherein i)+ii)+iii)+iv)=100%.

11. An aqueous coating composition according to claim 1, comprising resin solids in the composition comprising at least 50 wt % of the autoxidisable urethanised polyesteramide resin based on the total weight of resin solids.

12. An aqueous coating composition according to claim 1, wherein the initial rough gloss value minus the rough gloss value measured at 4 days after film formation is less than 10 gloss units.

13. A substrate coated with the aqueous coating composition according to claim 1.

14. A method for coating a substrate comprising applying the aqueous coating composition according to claim 1 to the substrate and then drying the aqueous composition to form a coated substrate.

15. A paint comprising the aqueous coating composition according to claim 1.

* * * * *